US005754663A

United States Patent [19]

Goldfarb

[11] Patent Number: 5,754,663

[45] Date of Patent: May 19, 1998

[54] FOUR DIMENSIONAL ACOUSTICAL AUDIO SYSTEM FOR A HOMOGENEOUS SOUND FIELD

[75] Inventor: Barry S. Goldfarb, Deland, Fla.

[73] Assignee: BSG Laboratories, Deland, Fla.

[21] Appl. No.: 413,430

[22] Filed: Mar. 30, 1995

[51] Int. Cl.[6] .......... H04B 3/00

[52] U.S. Cl. .......... 381/82; 381/182

[58] Field of Search .......... 381/17, 18, 24, 381/77, 82, 182

[56] References Cited

U.S. PATENT DOCUMENTS

| | | | |
|---|---|---|---|
| 2,179,840 | 11/1939 | Bucky . | |
| 3,113,633 | 12/1963 | Eberhardt et al. | 381/24 |
| 3,397,286 | 8/1968 | Prewitt et al. . | |
| 3,947,635 | 3/1976 | Frankman . | |
| 3,999,014 | 12/1976 | Bascom | 381/82 |
| 4,224,467 | 9/1980 | Lewis et al. . | |
| 4,230,905 | 10/1980 | Crum et al. . | |
| 4,348,552 | 9/1982 | Siccone . | |
| 4,423,655 | 1/1984 | Turner . | |
| 4,450,322 | 5/1984 | Wilson . | |
| 4,569,076 | 2/1986 | Holman . | |
| 4,593,404 | 6/1986 | Bolin | 381/82 |
| 4,882,753 | 11/1989 | Shivers | 381/24 |
| 4,932,060 | 6/1990 | Schreiber | 381/24 |
| 4,953,223 | 8/1990 | Householder . | |
| 4,991,688 | 2/1991 | Kery et al. . | |
| 5,033,577 | 7/1991 | Veranth . | |
| 5,077,801 | 12/1991 | Hughes Jr. . | |
| 5,131,051 | 7/1992 | Kishinaga et la. | 381/81 |
| 5,193,118 | 3/1993 | Latham-Brown et al. . | |
| 5,233,664 | 8/1993 | Yanagawa et al. | 381/89 |
| 5,291,556 | 3/1994 | Gale | 381/24 |
| 5,412,732 | 5/1995 | Kanishi et al. | 381/24 |

FOREIGN PATENT DOCUMENTS

| | | | |
|---|---|---|---|
| 5-176391 | 7/1993 | Japan | 381/24 |

OTHER PUBLICATIONS

Bailey, T. and J.E. Hubbard, 1985. "Distributed piezoelectric–polmer active vibration control of a cantilevered beam." AIAA Journal of Guidance and Control, 6(5), pp. 605–611.

Burke, S.E. and J. Hubbard, 1987. "Active vibration control of a simply supported beam using a spatially distributed actuator, "IEEE Control System Magazine, pp. 25–30.

Clark, R.L., R.A. Burdisso and C.R. Fuller, 1992. "Design approaches for shaping polyvinylidene fluoride sensors inactive structural acoustic control, "The Journal of Intelligent Material Systems and Structures, 4, pp. 354–365.

Crawley, E.F., and J. de Luis, 1987. "Use of piezoelectric actuators as element of intelligent structures, "AIAA Journal, 25(10), pp. 1373–1385.

Fahy, F. 1985. Sound and Structural Vibration, Academic Press, New York pp. 241–260.

Guyton, A.C. 1991. Basic Neuroscience: Anatomy and Physiology, W.B. Saunders Company, Harcourt Brace Jovanovich, Inc., Philadelphia, pp. 177–187.

Hebrank, J.H. and D. Wright, 1974. "Are two ears necessary for the localization of sound sources on the median plane?, "Journal of the Acoustical Society of America, 56, pp. 957–962.

Hebrank, J.H. and D. Wright, 1975. "Spectral cues used in the localization of sound sources on the median plane, "Journal of the Acoustical Society of America, 58.

(List continued on next page.)

*Primary Examiner*—Forester W. Isen
*Attorney, Agent, or Firm*—Quarles & Brady

[57] ABSTRACT

A four-dimensional acoustical audio system utilizes both spatial and temporal signal processing to provide uniform sound throughout a range of ear levels in an enclosure and combines the output of loudspeakers above and below the desired level to substantially eliminate the perceived direction and location of the sound sources and effectively creates a phantom sound source at the desired level

10 Claims, 5 Drawing Sheets

OTHER PUBLICATIONS

Kinsler, L.E., A.R. Frey, A.B. Coppens and J.V. Sanders, 1982. Fundamentals of Acoustics, Third Edition, John Wiley & Sons, Inc., Canada, pp. 246–278.

Lee, C.K., and F.C. Moon, 1990. "Modal sensors/actuators, "ASME Journal of Applied Mechanics, 57, pp. 434–441.

Nelson, P.A. 1994. "Active control of acoustic fields and the reproduction of sound," Journal of Sound and Vibration, 177(4) pp. 311–319.

Moore, B.C.J., 1989. An Introduction to the Psychology of Hearing, Third Edition, Academic Press, New York.

Morse, P.M. and K.U. Ingard, 1986, Theoretical Acoustics, Princeton University Press, pp. 576–599.

Pierce, A.D., 1989, Acoustics, Acoustial Sociey of America, pp. 284–286.

Roffler, S.E. and R.A. Butler 1968. "Factors that influence the localization of sound in the vertical plane," Journal of the Acoustical Society of America, 43, pp. 1255–1259.

Stevens, S.S., and E.B. Newman, 1936. "The localization of actual sources of sound," American Journal of Psychology, 48, pp. 297–306.

Wallach, H., E.B. Newman and M.R. Rosenzweig, 1949. "The precedence effect in sound localization," American Journal of Psychology, 62, pp. 315–336.

Yost, W.A. and D.W. Nielsen, 1985. Fundamentals of Hearing, Holt Rinehart and Winston, New York, Second Edition, pp. 151–170.

FOUR DIMENSIONAL ACOUSTICAL AUDIO SYSTEM FOR A HOMOGENEOUS SOUND FIELD

FIELD OF THE INVENTION

The invention relates to audio system design in commercial establishments, and is more particularly concerned with spatial and temporal signal processing techniques for loudspeaker system design to achieve optimal psychoacoustic impact with a homogeneous sound field in such establishments.

BACKGROUND OF THE INVENTION

In commercial audio applications, the focus is to provide sound without interfering with the function of the facility. In the case of restaurants, the loudspeaker system cannot physically interfere with diners and the movement of patrons and employees about the enclosure. For store environments, the sound system cannot interfere with the movement of customers among aisles or racks, and in some circumstances, must accommodate the movements of racks displays and the like. In indoor shopping malls, the loudspeakers cannot be positioned in such a manner as to disrupt the wide area traffic flow. Hence, the standard for providing unobstructed loudspeaker systems in these applications is to mount or suspend them from the ceiling of the enclosure. Alternatively, speakers may be mounted along walls, for example, on cantilever platforms.

The ceiling placement of these loudspeaker systems requires increase d power to project the sound to the listening levels of the patrons, particularly in the case of seated diners in a restaurant. As a result, the volume perceived by standing patrons and employees may be unacceptably loud and the perceived direction may appear unnatural. Moreover, the increased power requires increased capabilities of the loudspeakers.

Because the ceiling mounted loudspeakers typically provide full frequency range sound, the upward directionality of the source is perceived by the observers and diminishes the psychoacoustic effect of feeling "in" and a part of the sound experience. For systems that utilize wall mounted systems, the presentation of the sound varies according to the observers position or seat and may be too loud for those right next to a speaker while too low for those at a distance.

SUMMARY OF THE INVENTION

It is an object of the invention to provide a four dimensional acoustical audio system that combines the selection of transducers, the placement of those transducers and the spectral separation of frequency to the transducers to optimize the psychoacoustic effect to the observer by creating a phantom plane of acoustic sources.

It is another object of the invention to provide the psychoacoustic experience to the observer with a focus on the binaural auditory system of the observer and not the audio source.

It is a further object of the invention to provide an acoustical audio system that presents a uniform sound experience in commercial environments, such as to seated diners in a restaurant, independent of the diners' orientation.

It is a still further object of the invention to provide an acoustical audio system that provides a uniform sound to a plurality of seated diners while simultaneously providing a different sound experience for standing patrons.

It is an even further object of the invention to provide an acoustical audio system that creates a sound field with an enclosure that can be observed from the outside as a localized sound source.

The achievement of these objects according to the invention requires a merger of different aspects, namely, transducer types, timbre, and balancing of spatial placement and temporal signal processing of audio design, without limitation to the stereophonic models of the existing technology. The invention manifests itself in a variety of embodiments that are the subject of this and copending applications, but each premised on a discovery of the merger of distinct aspects of the audio system design in relation to the physiology of hearing and psychoacoustics.

According to the invention, however, these individual aspects should not be used alone. For example, while an excessively large quantity of transducers can be utilized to achieve a desired auditory effect, the optimization of transducer type with placement and appropriate temporal signal processing can reduce the number of transducers needed to produce the effect and yet produce a more realistic effect than the larger quantity array could.

Spatial placement according to the invention has the function of establishing the acoustic framing of the auditory experience being created. According to the invention, the placement varies according to the application and is coordinated with the transducer selection and temporal signal processing to optimize the experience of the application.

In one aspect of the invention, a phantom array of stereophonic sound sources is created in the plane of the listeners' ears through the balancing of arrays of loudspeakers above and below the listening plane. Further, one or more subwoofers can be used to close the envelope of the sound filed and couple uniform bass to the dynamics of the enclosure.

A full range loudspeaker array is placed below a desired plane of listening and a full range speaker array is placed above the plane. The desired plane can, for example, be the ear level of seated diners in a restaurant (around 3 or 4 feet above ground). By placing an array of loudspeakers in a plane above the ear level of the intended audience and also placing an array of loudspeakers in a plane below the ear level of the intended audience, a phantom array of image sources is created in the plane of the ear when the intensity of each array is balanced. The intended audience is thus immersed in the sound filed uniformly. It has been found that a wide range extended bass response to approximately 550 Hz together with a wide range bi-pole transmission above and below the observer properly coupled to a room can achieve an ideal "envelope" in the desired plane of the intended audience.

Program material such as from a prerecorded compact disc is filter through signal processing, passing a frequency bandwidth of program material extending from preferably 150 Hz to 15 kHz to each planar array of loudspeakers. In addition, the program material below 550 Hz and not above 1000 Hz is passed to each of the subwoofer units to deliver sufficient energy at low frequencies.

According to the invention, this placement of full range loudspeakers creates a phantom source in the plane of the intended listeners' ears. The source is uniform and substantially omnidirectional. In essence, the relative magnitude of the upper array of loudspeakers is balanced, primarily through volume control, with the lower array of loudspeakers to create the illusion of a sound source emanating from a predetermined listening plane. Thus, the observer has substantially the same experience, independent of his seating direction. This application is enhanced by the distribution of the low frequency program material to a sub-woofer coupled to the room and essentially a full range sound dispersion above and below the observers. Thus, the merger of transducer type, placement and temporal signal processing according to the techniques of the invention optimize the auditory experience in the restaurant dining environment for the binaural auditory system.

According to the invention, an embodiment of a four dimensional acoustical audio system for immersive, omnidirectional observation by a binaural auditory system in, for example, a restaurant environment can include an audio source, such as a CDI player, and audio amplifier system having a plurality of output channels for distributing program material; a preferably broad range speaker array placed below a specified height; and another broad range speaker array placed above a specified height. Preferably, the system also includes at least one sub-woofer loudspeaker coupled to the walls or floor of the room.

The height range between the broad range speakers can be selected to correspond to the ear level of seated diners. Thus, the lower speaker can be mounted less than three feet above the ground, such as in a bench seat of a booth, and the higher speaker can be suspended from the ceiling to as close to ear level as permitted by traffic, building regulations and other limiting factors.

The input to the sub-woofer is limited to less than 1000 Hz and preferably less than 550 Hz. The broad range speakers receive preferably full range signals ranging in frequency from less than 150 Hz to greater than 15 kHz.

The invention in its various embodiments provides a new approach to sound design by synergistically combining transducer selection, spatial and temporal signal processing to provide uniform sound experiences at one level and simultaneously vary within the same enclosure according to the observer's vertical position (standing or seated) in the sound field. The sound field created within the enclosure, such as a room of the restaurant, also appears as a whole as a point source of the sound from outside the enclosure, which can have applications in creating a welcoming atmosphere.

The upper and lower configuration of loudspeakers can be power balanced to provide a predetermined sound level at the ear level of seated diners, removing the directionality associated with the plurality of transducers. This sound level can be selected to allow the diners to hear and enjoy the music, atmospheric sounds or other programming at a volume that does not interfere with conversation and dining.

While it is desirable to keep the sound volume below a certain level for seated diners and to have this sound level uniform throughout, it is also desirable to have a louder experience for standing patrons because the louder music or atmospheric sound, such as crashing waves and other wharf side sounds in a seafood restaurant, can provide significant psychoacoustic effects for the observer by placing the listener in the experience.

Because the upper loudspeakers are at a greater distance from the observer, the sound level is higher above the seated diners, such as for standing patrons moving to and from tables. However, the loudness need not be unacceptable as in prior ceiling-based designs because the use of the lower speakers in the present invention to assist in providing the sound level to seated observers allows the power of the upper speakers—and thus the volume at the standing level—to be correspondingly lower.

The upper and lower speaker configuration of the invention also provides an envelope by substantially eliminating the perceived directionality of the speakers by the overlapping sound fields from above and below. The non-directional effect not only provides a uniform experience at the ear level throughout the enclosure but also more realistically presents the sound experience to the observer.

The uniform sound field created by the invention also provides auditory advantages to the commercial environment from outside this perspective. The sound field as a whole is perceived as a realistic source to patrons approaching the enclosure. In a seafood restaurant example, the presentation of wharf side sounds through the system gives an approaching observer the auditory perception that the sea is present in the enclosure, emanating uniformly from the doors and windows as opposed to being significantly filtered as in typical ceiling mounted applications. This realistic presentation can be used to enhance the patrons introduction to the experience being create by the commercial establishment.

BRIEF DESCRIPTION OF DRAWINGS

A more thorough understanding of the invention can be gained from the following detailed description in conjunction with the accompanying drawings, in which.

DESCRIPTION OF PREFERRED EMBODIMENTS

The present invention relates to the application of temporal and spatial signal processing to acoustically optimize the sound field for a binaural auditory system, namely, human ears. While the techniques of the invention can be directed to a number of environments, the present specification is dedicated to the use of the invention to provide a homogeneous sound field along a plane or series of planes to improve the sound experience in a variety of environments, including restaurants, retails stores, indoor malls and other commercial locations. The preferred embodiments of the invention will be set forth with particular reference to a restaurant application.

Figure 1:
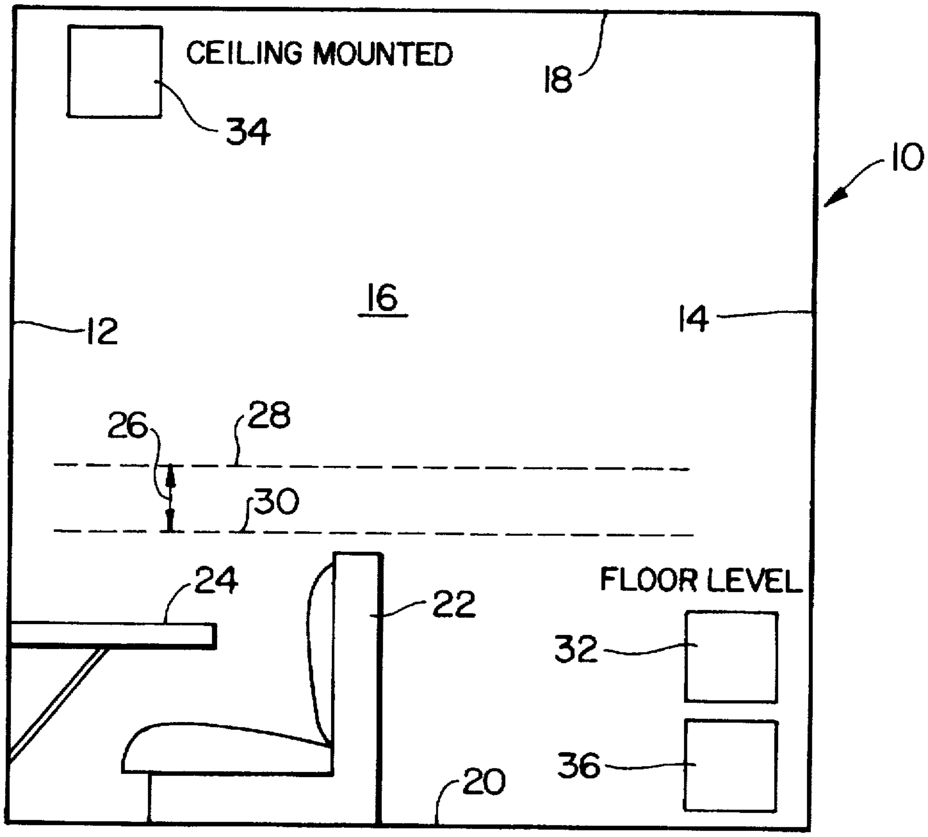
FIG. 1 is a side elevational view of an embodiment of the invention.

Referring to FIG. 1, the system of the invention can be used in an enclosure, such a room 10 of a restaurant. The room 10 can have a left wall 12, a right wall 14, a rear wall 16 and a front wall (not shown). The room 10 typically a ceiling 18 and a floor 20. The room 10 can be provided with fixtures, such as a booth seat 22 and a table 24 for use by diners. The walls 12, 14, 16 can have openings, such as windows and doors.

The system provides a homogeneous sound field along a range 26 of horizontal planes from a plane 28 to a plane 30, which can be controlled to correspond with the typical ear heights of seated diners. This range 26 can be established as three or four feet above the floor. It is desirable to provide the sound field in this range 26 in a non-directional manner so that observers do not sense that the sound is emanating from a particular source and instead perceive that the sound is realistically occurring around them. The non-directional perception should also be substantially the same for various diners oriented in different directions.

According to the invention, a first, lower broad range audio loudspeaker 32 positioned below a predetermined height 30 of the range 26. The broad range audio loudspeaker 32 is configured to be driven by a signal ranging in frequency from less than 200 Hz to greater than or equal to 15 kHz. Preferably, the frequency range is approximately 150 Hz to 16 kHz.

A second, upper broad range audio loudspeaker 34 is placed at a second height vertically higher than said first broad range loudspeaker 32 and above the upper plane 28 of the range 26. This second loudspeaker 34 can be mounted adjacent the ceiling 18. The second, upper loudspeaker 34 has an input with a frequency range substantially equal to the input frequency range of the first broad range audio loudspeaker 32. Accordingly, a sound envelope is established between the height of the first broad range audio loudspeaker 32 and the height of the second broad range audio loudspeaker 34, and particularly in the range 26 as discussed more fully below.

Preferably, the upper loudspeaker 34 and the lower loudspeaker 32 are brought as close to the plane(s) 28, 30 of listening as possible. The proximity is, however, limited by a number of factors. First, a variety of ear levels for seated diners needs to be accommodated. Also, the placement of the loudspeakers cannot interfere with the normal movements of diners and restaurant employees.

The lower loudspeaker 32 can be mounted to the side wall 14 or below a seat 22 or table 24 below the range 26 of listening planes 28, 30, and the upper loudspeaker 34 can be mounted to or suspended from the ceiling 18 above the range 26 and above the height of standing patrons, employees and the like. The power from the upper loudspeaker 34 and the lower loudspeaker 32 can be balanced in the range 26 of ear levels for seated diners.

To achieve the balance, the signal to the lower loudspeaker 32 can be sent without sending a signal to the upper loudspeaker 34. A sound pressure meter can be placed at the seated ear level, for example, the plane 28, and the power to the lower loudspeaker 32 can be adjusted until the meter indicates a predetermined value, for example, 86 dB. A signal is then sent to the upper loudspeaker 34 without sending a signal to the lower loudspeaker 32. The power level to the upper loudspeaker 34 is adjusted until the same value is indicated on the sound pressure meter.

The resulting balance provides a non-directional sound filed at the ear level height and the perception that the sound is emanating at the ear level. Thus, the listener senses that he is "in" the sound experience. Because of the power balance, the sound pressure level (SPL) is higher towards the upper speaker 34. Accordingly, a louder sound will be experienced by standing listeners. However, the volume is more acceptable than the level provided in prior systems that were forced to deliver at even higher volumes to be appreciated by those seated. With the assistance of the lower loudspeaker 32, the upper loudspeaker 34 can provide a suitable volume for standing observers.

The invention also provides a sub-woofer loudspeaker 36 to deliver bass sound to the room 10 below at least 600 Hz and preferably below 250 Hz to avoid directionality in the sound field. The sub-woofer enclosure 36 is preferably placed at the floor level in one of the corners of the room 10.

The broad range loudspeakers 32, 34 and the sub-woofer 36 are driven by an amplifier system, which amplifies signals from an audio source, such as a CD player, CDI, tape player, broadcast tuner or a microphone. The amplifier system can include a single, multichannel amplifier for driving the various loudspeakers in the system or can include separate amplifiers for the different loudspeakers. Preferably, the amplifier system includes a four or five channel amplifier that is bridgeable, with approximately 50 watts per channel. A preferred amplifier is the DCM 3500 amplifier with multichannel configurations of three channels at 80 watts per channel, four channels at 40 watts per channel, or five channels with four channels at 40 watts and one channel at 80 watts for driving the broad range speakers. The DCM 3500 is manufactured by Denon. Alternative amplifiers include a Z-50S4 four channel amplifier with 12.5 watts per channel, a Z-100S2 two channel amplifier with 50 watts per channel, a Z-150S2 two channel amplifier with 75 watts per channel, and a Z-300S2 two channel amplifier with 150 watts per channel. These amplifiers are manufactured by Zapco. Further, the amplifier system can include a UAW 4200 four channel amplifier with 20 watts per channel, a UAW 4300 four channel amplifier with 30 watts per channel and a UAW 4400 four channel amplifier with 40 watts per channel. Preferably, the sub-woofer is driven by a separate, dedicated amplifier having two channels at 150 watts per channel.

Figure 2:
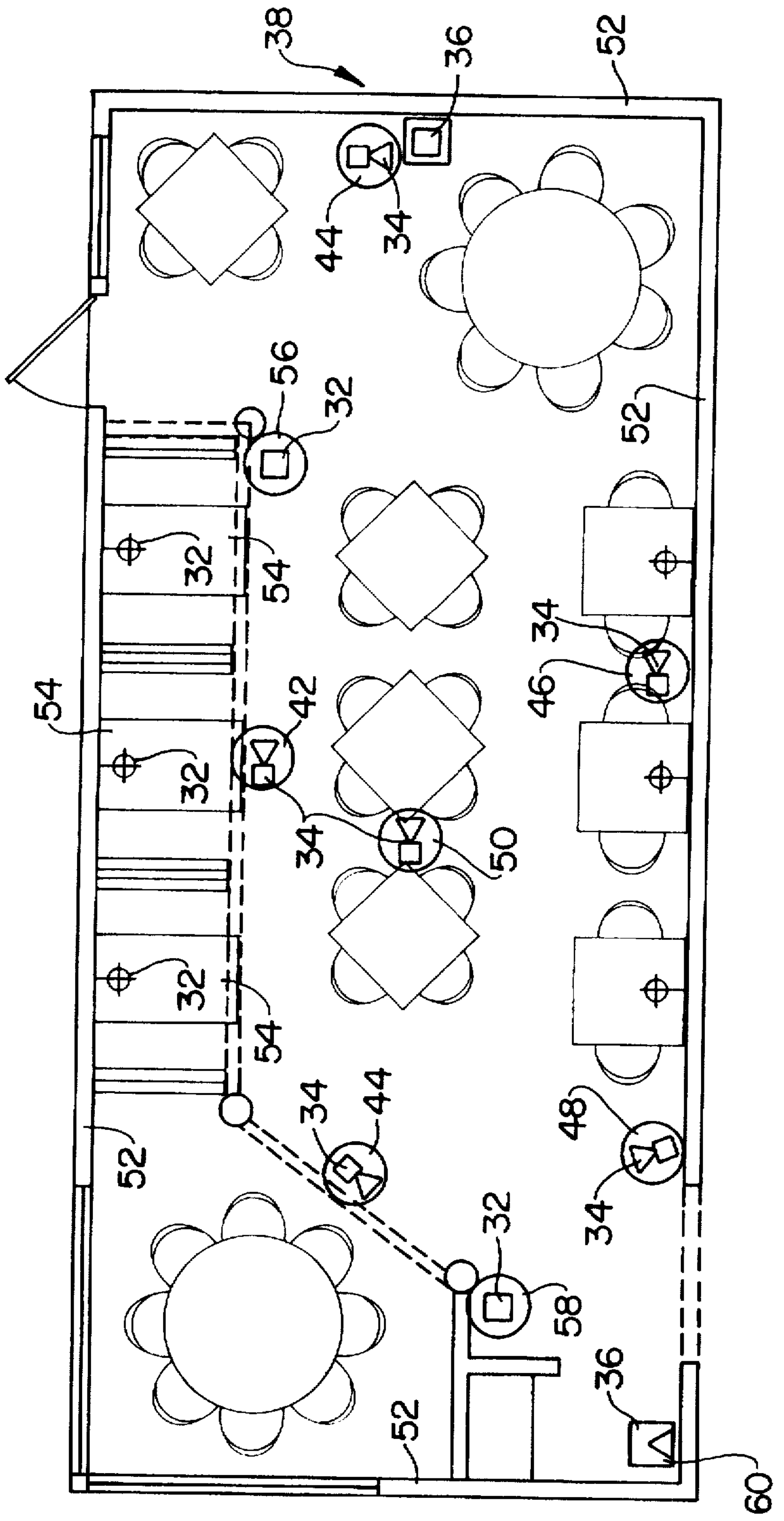
FIG. 2 is a top plan view of one preferred arrangement of the loudspeaker system of the invention in a restaurant environment.

Referring to FIG. 2, the broad range loudspeakers can be arranged throughout the room 38 to vary the direction of the dispersion fields from each of the broad range loudspeakers to further enhance the uniformity of the overall sound filed in the enclosure. In a restaurant environment as illustrated in FIG. 2, a plurality of upper, broad range speakers 34 can be mounted to or suspended from the ceiling at the locations 40, 42, 44, 46, 48 and 50. The lower, broad range loudspeakers 32 are arranged slightly above the floor level and can be positioned along the walls 52 below tables 52 and at walkway locations 54 and 56.

A preferred loudspeaker construction for the broad range loudspeakers 32, 34, as discussed more fully below, utilized a pair of axially arranged and opposing speakers so that two sound fields are projected, each in an opposite direction. The separate sound fields can be arranged relative to adjacent loudspeakers to overlap and maintain the uniformity of the homogenous sound field. The sub-woofer loudspeakers 36 are preferably placed adjacent a wall 52 of the room 38 and in a corner 60.

Figure 4:
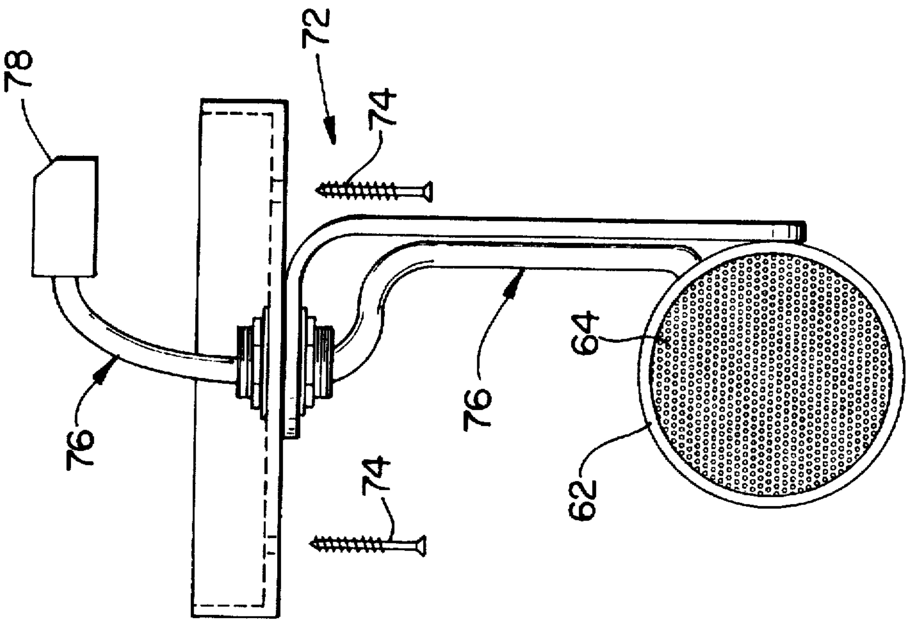
FIG. 4 is a right side elevational view thereof.
Figure 3:
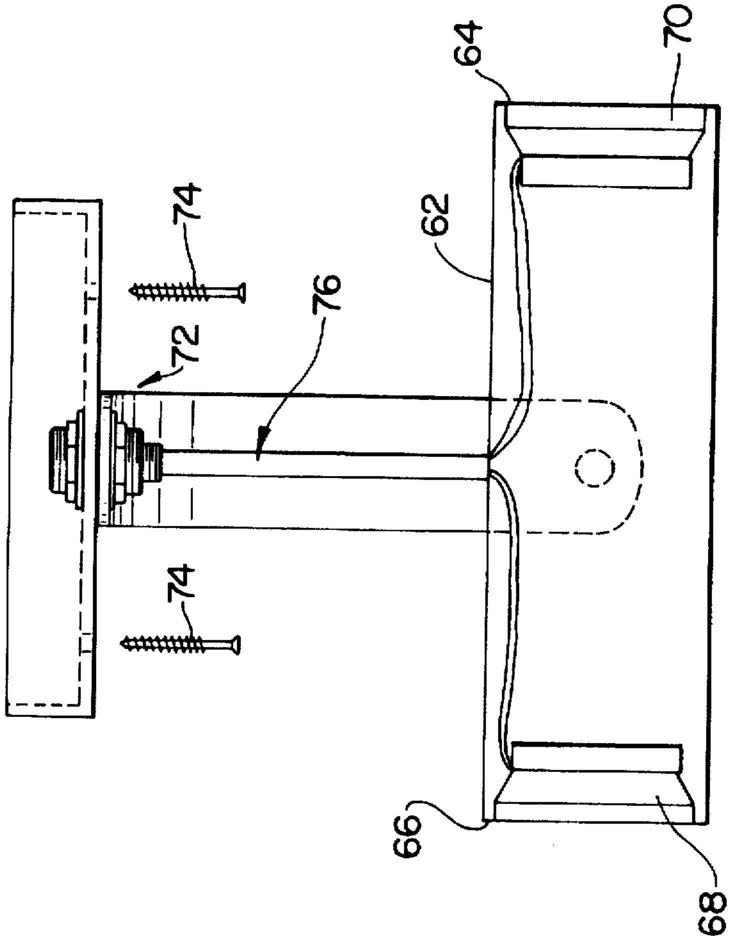
FIG. 3 is a front elevational view of a preferred broad range speaker device for use in the system of the invention.

Referring to FIGS. 3 and 4, a preferred embodiment of the broad range loudspeaker 32, 34, particularly for use as an upper loudspeaker 34 mounted to the ceiling, includes an elongated hollow enclosure 62 having two open ends 64, 66. A full range transducer 68, 70 is mounted into each of the open ends 64, 66 facing outwardly. The preferred loudspeaker combines powerful transducers with the enhanced bass frequency performance of the elongated opposing speaker enclosure that is dampened to allow full range performance in a compact construction.

The enclosure 62 can be mounted to or suspended from a ceiling by a bracket 72 secured by screws 74. The transducers 68, 70 can be supplied with signals by cables 76. Preferably, the cables 76 are interfaced with the cabling to the amplifiers by a Molex connecter 78. The elongated axis of the enclosure should be angled relative to horizontal between 30 degrees and 60 degrees. The particular angle of each enclosure in an array should be varied within this range to generate a uniformly diffuse sound field.

The transducers 68, 70 are preferably 2.5 inch diameter 10–15 RMS speaker with 20–25 W peak capacity. One preferred loudspeaker having these size and power parameters is the Sanyo S065G49B, produced by Sanyo Electric Co. Ltd. Alternatively, speakers having a power ratings of at least 8 W RMS and 15 W peak can be used.

The enclosure 62 is preferably cylindrical and made at least partly of a viscoelastic material, such as Butyrate 665, manufactured by the Eastman Chemical Company. Because of the dampening effect of the viscoelastic material and the power capacity of the speakers 68, 70, the enclosure 62 can be less than 8 inches long. This compact size enables inconspicuous mountings to walls and flush mounts along bench sides and the like along walkways. The compact size also allows for unobstructing ceiling mounts and suspensions from the ceiling. The ceiling surface adjacent the upwardly directed transducer of he angled loudspeaker enclosure should be reflective to radiant the sound downwardly.

Figure 5:
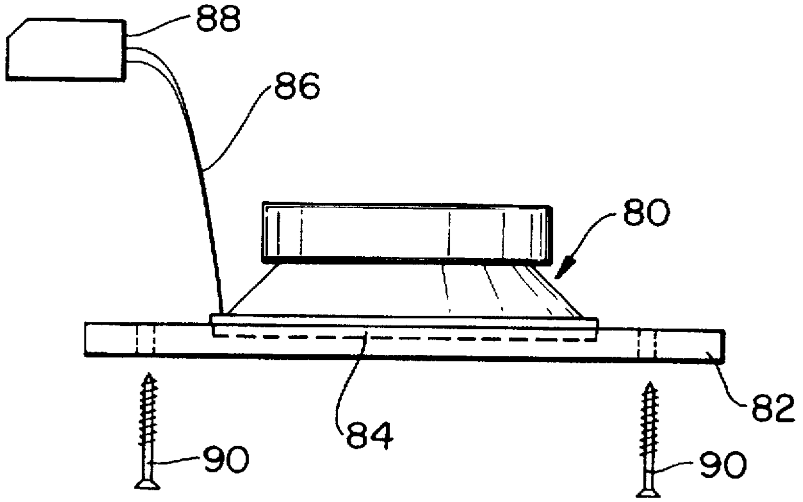
FIG. 5 is a side elevational view of another preferred broad range speaker device for use in the system of the invention.
Figure 6:
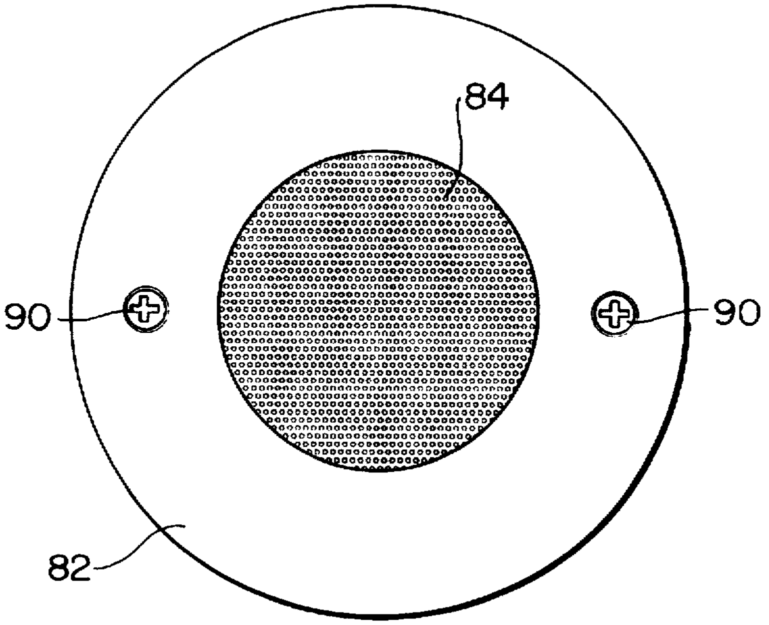
FIG. 6 is a top plan view thereof.

Referring to FIGS. 5 and 6, the broad range loudspeaker can alteratively be embodied in a transducer 80 supported on a mounting plate 82 having an aperture 84 for the sound emission from the front of the transducer 80. This construction is preferred for wall mountings. The transducer 80 can be supplied with driving signals by a cable 86 interfaced with system cabling by a Molex connector 88. The plat can be mounted to a wall position by screws 90, and the wall can provide a cavity (not shown) to allow the back of the transducer cone to recess in the wall.

The transducer 80 preferably has the same size and power specifications as discussed above for the elongated embodiment.

Figure 7:
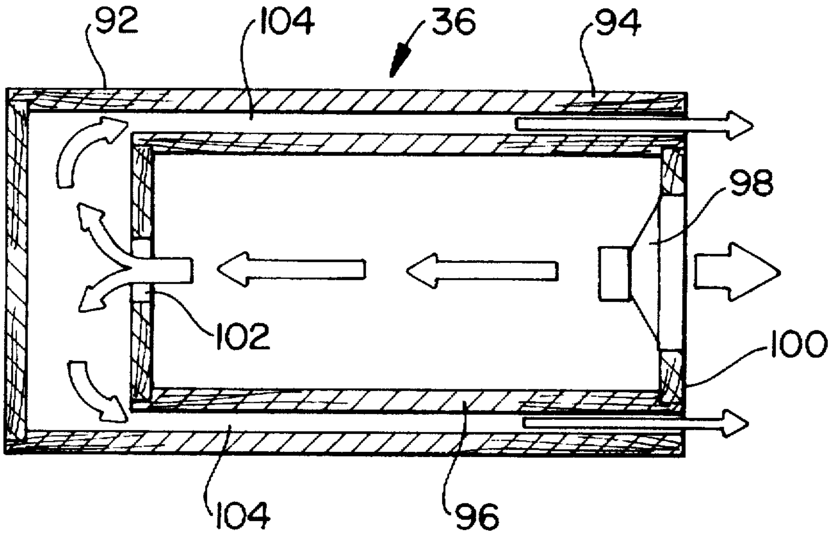
FIG. 7 is a side sectional view of a bass loudspeaker for use in the system of the invention.
Figure 8:
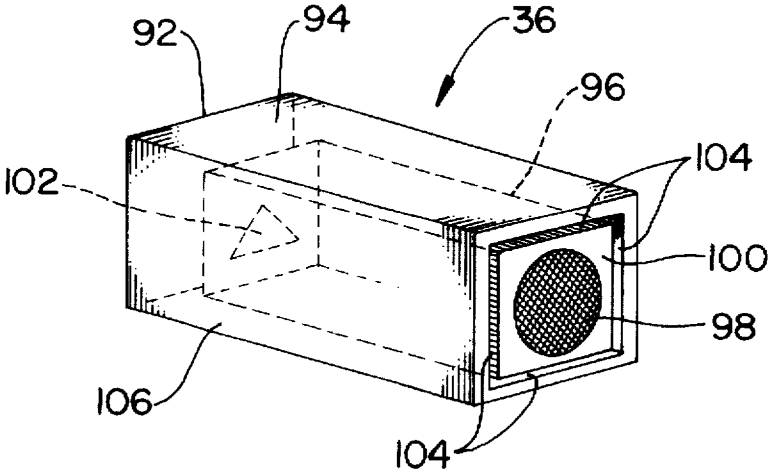
FIG. 8 is a perspective view thereof.

Referring to FIGS. 7 and 8, the sub-woofer 36 is preferably housed in a nested enclosure 92 having an inner box 94 and an outer box 96. The driver 98 is mounted outwardly on the exterior side 100 of the inner box 96. The back wave of the driver 98 is propagated from the inner box 96 through a preferably triangular aperture 102 to the interior of the outer box 94, in which it is reflected along peripheral channels 104 to the location of the front of the driver 98. The inner box 96 can be adjusted relative to the outer box 94 to control the phase relationship of the reflected back wave to the front wave. The driver 98 is preferably a six inch driver with at least a 100 W power capacity, such as GEFCO Model No. 6028865 by GEFCO Manufacturing Co.

At least two sub-woofer enclosures 92 are preferably used in the room 38 (see FIG. 2), one oriented vertically and one oriented horizontally. The vertically oriented arrangement directs the speaker side 100 down and is elevated off the ground by mounting to a wall. The horizontally oriented arrangement can be positioned on the floor and can direct the speaker side 100 toward a corner. The outer box 94 can be configured to blend with the decor of the environment, such as by providing a ship crate wooded siding 106, further disguising the location of the bass source in complement to the non-directional nature of the sound field.

The foundation for a homogenous sound field that provides a uniform sound experience independent of the listener's direction of orientation, can be provided as discussed above and enhanced by additional techniques. In the high frequency range, the invention proposes to avoid the highly perceived directionality by limiting the upper frequency of the broad range loudspeakers to 15 kHz. No tweeters or other high frequency device is used for the frequencies above 15 kHz. Instead, the upper range from 12 kHz to 15 kHz can be boosted, for example 3 dB, to create an illusionary perception of the high frequency sounds within the homogeneous sound field.

Although the invention has been described with particular reference to a restaurant environment with seated listeners oriented in a plurality of directions, the invention can have application in other multi-orientation areas, such as indoor malls, ballrooms, plazas and convention centers. The invention is not intended to be limited to the preferred arrangements set forth above, but rather only by the scope of the appended claims.

I claim:

1. A four dimensional acoustical audio system for immersive, omnidirectional observation by a binaural auditory system in an auditory envelope, said audio system comprising:

an enclosure substantially throughout which listeners can be seated facing in any direction and substantially throughout which listeners can stand and move about facing in any direction, said enclosure being defined by vertical walls, a ceiling and a floor;

an audio source;

an audio amplifier system receiving a signal from said audio source and having a plurality of output channels providing respective amplified sound signals, each of said amplified sound signals being substantially identical in waveform and in phase;

a first array of at least four broad range audio loudspeakers positioned below a predetermined height, said broad range audio loudspeakers being positioned at a first height and distributed horizontally at said first height throughout said enclosure including at least one broad range audio loudspeaker adjacent a periphery of said enclosure, said first array of broad range audio loudspeakers having a first set of inputs from said output channels, said first set of inputs ranging in frequency from less than 200 Hz to at least 15 kHz and being substantially identical in amplitude;

a second array of at least four broad range audio loudspeakers placed at a second height vertically higher than said predetermined height, said broad range audio loudspeakers being distributed horizontally at said second height throughout said enclosure including at least one broad range audio loudspeaker adjacent said periphery of said enclosure, said second array of audio loudspeakers having a second set of inputs from said output channels, said second set of inputs also ranging in frequency from less than 200 Hz to at least 15 kHz and being substantially identical in amplitude, no other broad range audio loudspeaker having an input ranging in frequency from less than 200 Hz to at least 15 kHz being positioned in the enclosure at a height other than said first height or said second height, a sound envelope being established substantially throughout said enclosure, said sound envelope having a lower boundary above said first array of broad range audio loudspeakers and an upper boundary below said second array of broad range audio loudspeakers; and, said amplifier system having means for adjustably amplifying said first and second sets of inputs from said output channels at respective magnitudes different from one another, said different respective magnitudes determining a vertical position of said sound envelope between said first and second arrays of broad range audio loudspeakers, whereby in response to adjustments of said respective magnitudes, substantial immersion in said sound envelope is selectively established for said seated listeners or for said standing and moving listeners, said amplifier system having no means for horizontal or lateral balance among said broad range audio loudspeakers in either said first or second array.

2. The dimensional acoustical audio system for immersive, omnidirectional observation according to claim 1, wherein said first array of broad range audio loudspeakers is placed less than three feet above the floor and said second array of broad range audio loudspeakers is placed at least eight feet above the floor.

3. The four dimensional acoustical audio system for immersive omnidirectional observation according to claim 1, further comprising means for further amplifying the sound signals to said first array of broad range audio loudspeakers and the sound signals to said second array of broad range audio loudspeaker above 12 kHz greater than the sound signals below 12 kHz.

4. A four dimensional acoustical audio system for immersive, omnidirectional observation according to claim 2, wherein the enclosure is a room of a restaurant, said first array of broad range audio loudspeakers is mounted to seats used by diners at the restaurant and said second array of broad range audio loudspeakers is suspended from the ceiling, whereby the sound envelope is created primarily at the ear level of the diner when sitting in the seat.

5. The dimensional acoustical audio system for immersive, omnidirectional observation according to claim 1, further comprising at least one sub-woofer loudspeaker having at least one low pass filtered input from said audio amplifier system, said input having a cutoff frequency less than 1000 Hz, said sub-woofer loudspeaker being placed on the floor adjacent one of the front wall, the right wall and the left wall, whereby the sub-woofer loudspeaker is coupled to dynamics of the enclosures.

6. The four dimensional acoustical audio system for immersive observation according to claim 5, wherein the cutoff frequency of the low pass filtered input is less than 600 Hz.

7. The four dimensional acoustical audio system for immersive, omnidirectional observation according to claim 1, wherein one of the vertical walls has at least one opening.

8. The four dimensional acoustical audio system for immersive, omnidirectional observation according to claim 5, wherein said audio amplifier system includes at least one audio amplifier for said first array of broad range audio loudspeakers and said second array of broad range audio loudspeakers and a separate audio amplifier for the sub-woofer loudspeaker.

9. A four dimensional acoustical audio system for immersive, omnidirectional observation by a binaural auditory system in an auditory envelope, said audio system comprising:

an enclosure substantially throughout which listeners can stand and move about facing in any direction, said enclosure being defined by vertical walls, a ceiling and a floor, said enclosure being a multi-level retail mall having a second floor suspended above the enclosure floor;

an audio source;

an audio amplifier system receiving a signal from said audio source and having a plurality of output channels providing respective amplified sound signals, each of said amplified sound signals being substantially identical in waveform and in phase;

a first array of at least four broad range audio loudspeakers positioned below a predetermined height, said broad range audio loudspeakers being positioned at a first height and distributed horizontally at said first height throughout said enclosure including at least one broad range audio loudspeaker adjacent a periphery of said enclosure, said first array of broad range audio loudspeakers having a first set of inputs from said output channels, said first set of inputs ranging in frequency from less than 200 Hz to at least 15 kHz and being substantially identical in amplitude;

a second array of at least four broad range audio loudspeakers placed at a second height vertically higher than said predetermined height, said broad range audio loudspeakers being distributed horizontally at said second height throughout said enclosure including at least one broad range audio loudspeaker adjacent said periphery of said enclosure, said second array of audio loudspeakers having a second set of inputs from said output channels, said second set of inputs also ranging in frequency from less than 200 Hz to at least 15 kHz and being substantially identical in amplitude, said first array of broad range audio loudspeakers being placed less than five feet above the floor and said second array of broad range audio loudspeakers being placed at least six feet above the floor, whereby a first sound envelope is created primarily at the ear level of observers standing in the enclosure on the floor; and, said amplifier system having means for adjustably amplifying said first and second sets of inputs from said output channels at respective magnitudes different from one another, said different respective magnitudes determining a vertical position of said first sound envelope between said first and second arrays of broad range audio loudspeakers;

a third array of at least four broad range audio loudspeakers placed less than five feet above the second floor, said broad range audio loudspeakers being positioned at a third height and distributed horizontally at said third height throughout said enclosure including at least one broad range audio loudspeaker adjacent said periphery of said enclosure, said third array of broad range audio loudspeakers having a third set of inputs from said output channels, said third set of inputs ranging in frequency from less than 200 Hz to at least 15 kHz and being substantially identical in amplitude;

a fourth array of at least four broad range audio loudspeakers placed at least six feet above the second floor, said broad range audio loudspeakers being positioned at a fourth height and distributed horizontally at said fourth height throughout said enclosure including at least one broad range audio loudspeaker adjacent said periphery of said enclosure, said fourth array of broad range audio loudspeakers having a fourth set of inputs from said output channels, said fourth set of inputs ranging in frequency from less than 200 Hz to at least 15 kHz and being substantially identical in amplitude, whereby a second sound envelope is created primarily at the ear level of observers standing in the enclosure on the second floor;

said amplifier system having means for adjustably amplifying said third and fourth sets of inputs at respective magnitudes different from one another, said different respective magnitudes determining a vertical position of said second sound envelope between said third and fourth arrays of broad range audio loudspeakers; no other broad range audio loudspeaker having an input ranging in frequency from less than 200 Hz to at least 15 kHz being positioned in the enclosure at a height other than said first height, said second height, said third height or said fourth height, said amplifier system having no means for horizontal or lateral balance among said broad range audio loudspeakers in either said first, second, third or fourth array.

10. A four dimensional acoustical audio system for immersive, omnidirectional observation by a binaural auditory system in an auditory envelope, said audio system comprising:

an outdoor environment throughout which listeners can stand and move about facing in any direction;

an audio source;

an audio amplifier system receiving a signal from said audio source and having a plurality of output channels providing respective amplified sound signals, each of said amplified sound signals being substantially identical in waveform and in phase;

at least one sub-woofer loudspeaker having at least one low pass filtered input from said audio amplifier system, said input having a cutoff frequency less than 1000 Hz placed on the ground;

a first array of at least four broad range audio loudspeakers positioned below a predetermined height, said broad range audio loudspeakers being positioned at a first height and distributed horizontally at said first height, outermost placed loudspeakers in said first array defining a periphery, said first array of broad range audio loudspeakers having a first set of inputs from said output channels, said first set of inputs ranging in frequency from less than 200 Hz to at least 15 kHz and being substantially identical in amplitude;

a second array of at least four broad range audio loudspeakers placed at a second height vertically higher than said predetermined height, said broad range audio loudspeakers being distributed horizontally at said second height, outermost placed loudspeakers in said second array being positioned adjacent said periphery, said second array of audio loudspeakers having a second set of inputs from said output channels, said second set of inputs also ranging in frequency from less than 200 Hz to at least 15 kHz and being substantially identical in amplitude, no other broad range audio loudspeaker having an input ranging in frequency from less than 200 Hz to at least 15 kHz being positioned in the enclosure at a height other than said first height or said second height, a sound envelope being established substantially throughout said environment within said periphery, said sound envelope having a lower boundary above said first array of broad range audio loudspeakers and an upper boundary below said second array of broad range audio loudspeakers; and said amplifier system having means for adjustably amplifying said first and second sets of inputs from said output channels at respective magnitudes different than one another, said different respective magnitudes determining a vertical position of said sound envelope between said first and second arrays of broad range audio loudspeakers, said amplifier system having no means for horizontal or lateral balance among said broad range audio loudspeakers in either said first or second array.

* * * * *